United States Patent [19]

Sullivan

[11] 4,382,412
[45] May 10, 1983

[54] DUAL DRIVE TRACTION SYSTEM

[75] Inventor: Donald P. Sullivan, Burnsville, Minn.

[73] Assignee: Universal Mobility, Inc., Salt Lake City, Utah

[21] Appl. No.: 164,428

[22] Filed: Jun. 30, 1980

[51] Int. Cl.³ .......................... B61B 5/02; B61C 3/00; B61C 13/04; F01B 5/02

[52] U.S. Cl. .................................. 104/124; 105/247; 105/30; 105/64 R; 105/133; 105/145; 105/215 R

[58] Field of Search ............... 104/124, 243, 247, 119, 104/120; 105/145, 150, 215 R, 34 P, 64 B, 144, 30, 64 R, 133

[56] References Cited

U.S. PATENT DOCUMENTS

| | | | |
|---|---|---|---|
| 1,102,615 | 7/1914 | Valentine | 105/145 X |
| 1,600,767 | 9/1926 | Lockwood | 105/124 X |
| 2,132,450 | 10/1938 | Wolf | 105/34 P |
| 2,226,432 | 12/1940 | Heinze | 104/124 |
| 2,932,258 | 4/1960 | Marquard | 105/145 X |
| 3,060,867 | 10/1962 | Holmquist | 105/145 |
| 3,426,703 | 2/1969 | Morris | 105/145 |
| 3,881,427 | 5/1975 | Blume | 105/145 X |
| 4,195,576 | 4/1980 | Gutridge | 105/150 X |
| 4,274,336 | 6/1981 | Pater et al. | 104/124 |

FOREIGN PATENT DOCUMENTS 346578 7/1960 Switzerland ...................... 105/34 P Primary Examiner—Bruce H. Stoner, Jr.
Assistant Examiner—Howard Beltran
Attorney, Agent, or Firm—H. Ross Workman; Rick D. Nydegger; Dale E. Hulse

[57] ABSTRACT

An auxiliary drive traction system for an automated guideway transit (AGT) vehicle. Remotely controlled hydraulic or electrically powered auxiliary drive systems are used to drive the AGT vehicle's lateral guide wheels, which are biased against a running surface, thus providing an auxiliary drive and braking system. A remotely controlled clutch may be added so as to selectively couple the auxiliary drive system and the guide wheels. A protective skirt is attached to the edges of the guideway assembly along its entire length in order to shield the guide wheel running surfaces from adverse weather conditions.

16 Claims, 5 Drawing Figures

DUAL DRIVE TRACTION SYSTEM

BACKGROUND

1. Field of the Invention

This invention relates to automated guideway transit (AGT) systems and, more particularly, to an auxiliary drive traction system for use with AGT vehicles.

2. The Prior Art

Automated guideway transit (AGT) systems are becoming a popular, efficient, and environmentally clean method of mass transportation, and are potentially a significant factor in energy conservation. In general, the drive systems for AGT vehicles comprise a motor located within the AGT vehicle which provides power to rotate the drive wheels. The drive wheels extend beneath the AGT vehicle body, resting upon a generally flat track surface which serves as a drive wheel running surface.

In addition to the main drive wheels many AGT vehicles have lateral guide wheels which are positioned on a separate guide wheel running surface that may be perpendicular to the drive wheel running surface. The guide wheels are designed to provide directional stability to the AGT vehicle as it travels along the guideway assembly. Typically, the guide wheels are freely rotatable, having no relationship to the power drive system of the AGT vehicle.

When AGT systems are used in cold weather climates, the drive wheel and guide wheel running surfaces of the tracks are exposed to the weather and can experience buildups of ice and snow. Even the formation of dew or frost on these running surfaces increases the hazard to passengers and may reduce the AGT system's operating efficiency. The collection of ice or snow on the AGT system's drive wheel and guide wheel running surfaces significantly reduces the AGT vehicle's traction. This problem is especially troublesome during the acceleration and deceleration phases of the AGT vehicle's operation. The lack of traction may be particularly hazardous in emergency situations.

Moreover, even during favorable weather conditions, if power to the main drive system is interrupted, the AGT vehicle becomes completely inoperative. Thus, power failures or mechanical breakdowns in the AGT vehicle's main drive system may seriously interrupt the traffic flow of an AGT system for prolonged periods.

What is needed is an auxiliary drive traction system to help provide good traction even when the normal drive wheel running surfaces are covered with snow and ice, and to provide means for operating the AGT vehicle in the event the main drive system becomes inoperable.

BRIEF DESCRIPTION AND OBJECTS OF THE INVENTION

The present invention is directed to an auxiliary drive traction system for AGT vehicles. A plurality of motors drive the lateral guide wheels of the AGT vehicle independently of the AGT vehicle's main drive system and a clutch system selectively engages or disengages the guide wheels from the motors. The running surface of the guide wheels is protected from the weather by an overhanging skirt so that the guide wheel running surface is kept free from ice and snow and is thus able to provide additional traction during adverse weather conditions. Remote operator control of the clutch and drive system permits selective engagement and disengagement of the auxiliary traction system as needed, thus reducing energy consumption and retarding mechanical wear of the system.

It is therefore a primary object of the present invention to provide an improved AGT system.

Another object of the present invention is to provide an auxiliary drive traction system for an AGT vehicle.

Another object of the present invention is to provide an auxiliary traction system for AGT vehicles that may be driven independently of the AGT vehicle's main drive system.

Yet another object of the present invention is to provide an auxiliary traction system which may be selectively engaged and disengaged by remote operator control.

Another object of the present invention is to provide a guide wheel running surface which is protected from the weather and is thus available for providing additional traction during adverse weather conditions.

These and other objects and features of the present invention will become more fully apparent from the following description and appended claims taken in conjunction with the accompanying drawings.

DETAILED DESCRIPTION OF THE PREFERRED EMBODIMENTS

The invention is best understood by reference to the figures wherein like parts are designated with like numerals throughout.

Figure 1:
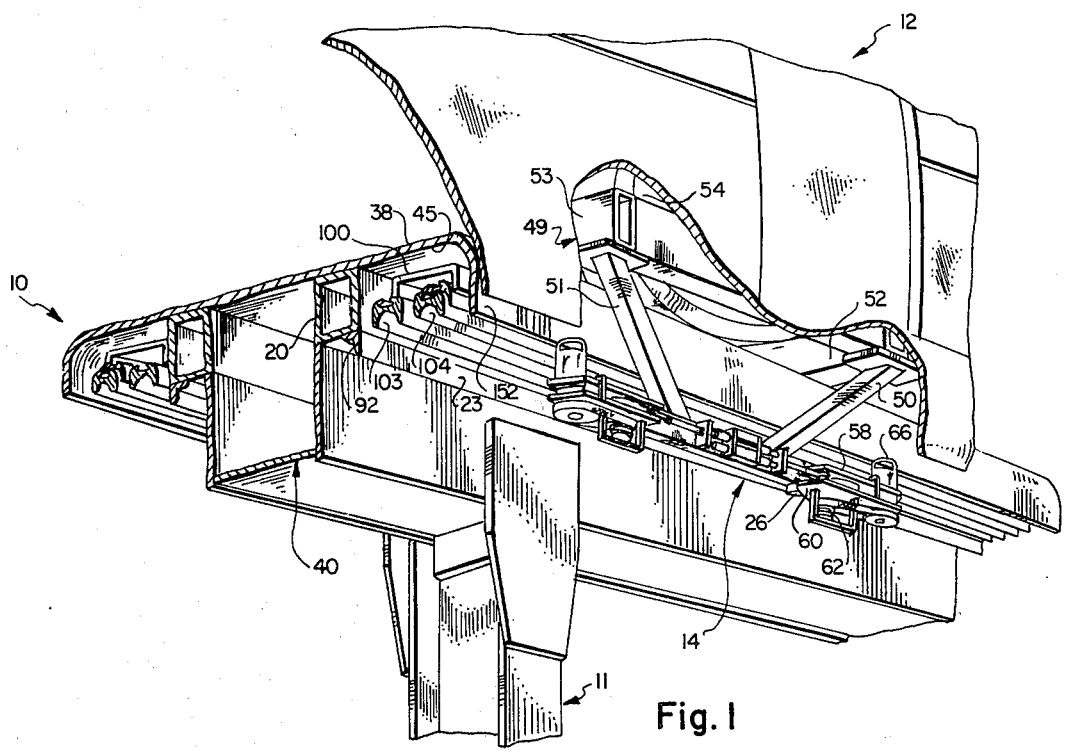
FIG. 1 is a fragmentary perspective view of an AGT system with portions of the AGT vehicle broken away to more particularly illustrate the auxiliary traction system of the present invention.

FIG. 1 illustrates a preferred monorail guideway assembly generally designated 10 and mounted upon vertical support columns generally designated 11. A portion of an AGT vehicle is generally depicted at 12, with a portion of the vehicle's sidewall illustrated as being broken away so as to reveal the positioning of the main drive wheels 54 and auxiliary traction system generally designated 14.

Since the guideway assembly 10 is symmetrical about its longitudinal axis, for purposes of simplifying the description, only one half of the guideway assembly is described in detail, it being understood that the other half is identically constructed. Each half of the guideway assembly 10 consists of a drive wheel running surface 38 and a support beam 20. The support beams 20 of each half of the guideway assembly 10 are supported by the vertical side walls of a truss 40. The running surfaces 38 of each half of guideway assembly 10 are normally coplanar and parallel, permitting the drive wheels 54 of the AGT vehicle to traverse the guideway assembly 10 quietly and safely. Each running surface 38 is rigidly mounted upon its corresponding support beam 20, which is coextensive with the running surface 38 so as to give structural support thereto.

Each beam 20 is positioned under the running surface 38 so as to define a rail overhang 45. The vertical sides of the beam 20 are essentially perpendicular to the plane of the drive wheel running surface 38, and may be vertically extended by welding a corresponding length of angle iron 92 to the underside of beam 20, thus forming a guide wheel running surface 23 (see also FIG. 2).

Figure 2:
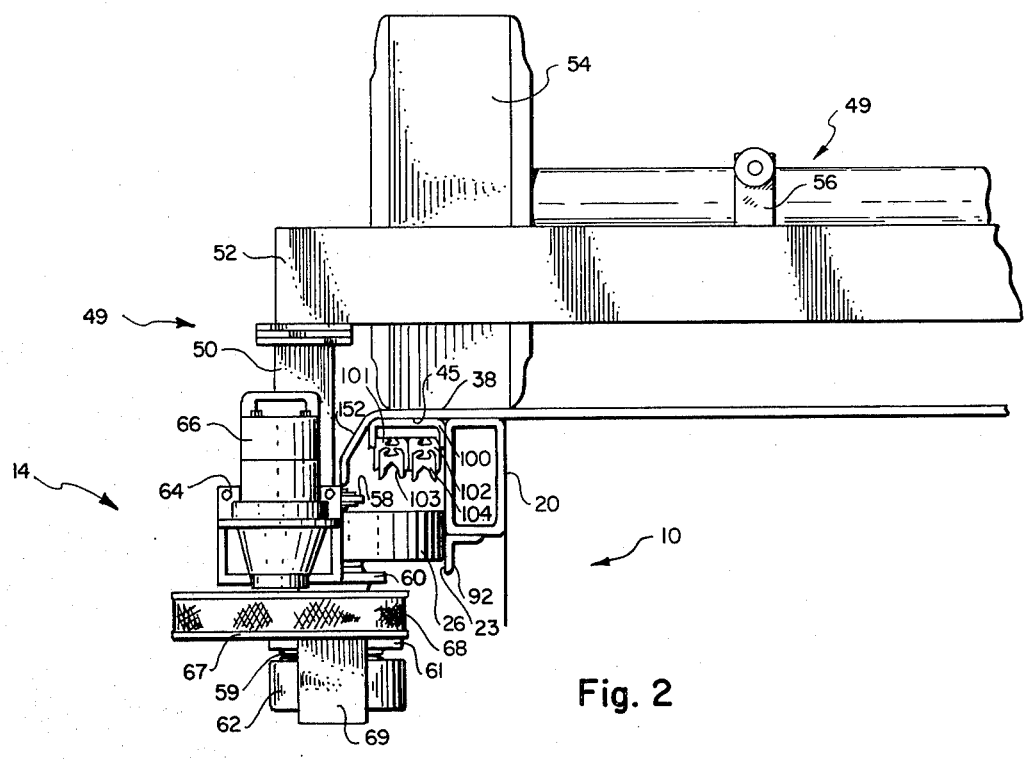
FIG. 2 is an elevated rear view of the auxiliary traction system of the present invention.

With further reference to FIGS. 1 and 2, a bracket 100 is shown welded to the underside of running surface overhang 45. Other brackets (not shown) are spaced along the length of the guideway assembly 10 and are used to secure clamps 101 and 102 which in turn support bus bars 103 and 104. Typically, two such bus bars 103 and 104 are mounted on each side of the guideway assembly 10. The bus bars extend along the entire length of the guideway assembly, and are used to provide power and control signals to the AGT vehicle 12.

As shown in FIGS. 1 and 2, an overhanging skirt 152 is attached to the outer edge of running surface 38 and extends along the entire length of the guideway assembly 10. The lower end of skirt 152 terminates at the lower end of bus bars 103 and 104, thus shielding the bus bars 103–104 from wind-driven snow and other adverse weather conditions. Also, the overhanging skirt 152 helps to shield the guide wheel running surface 23 from the weather.

Figure 3:
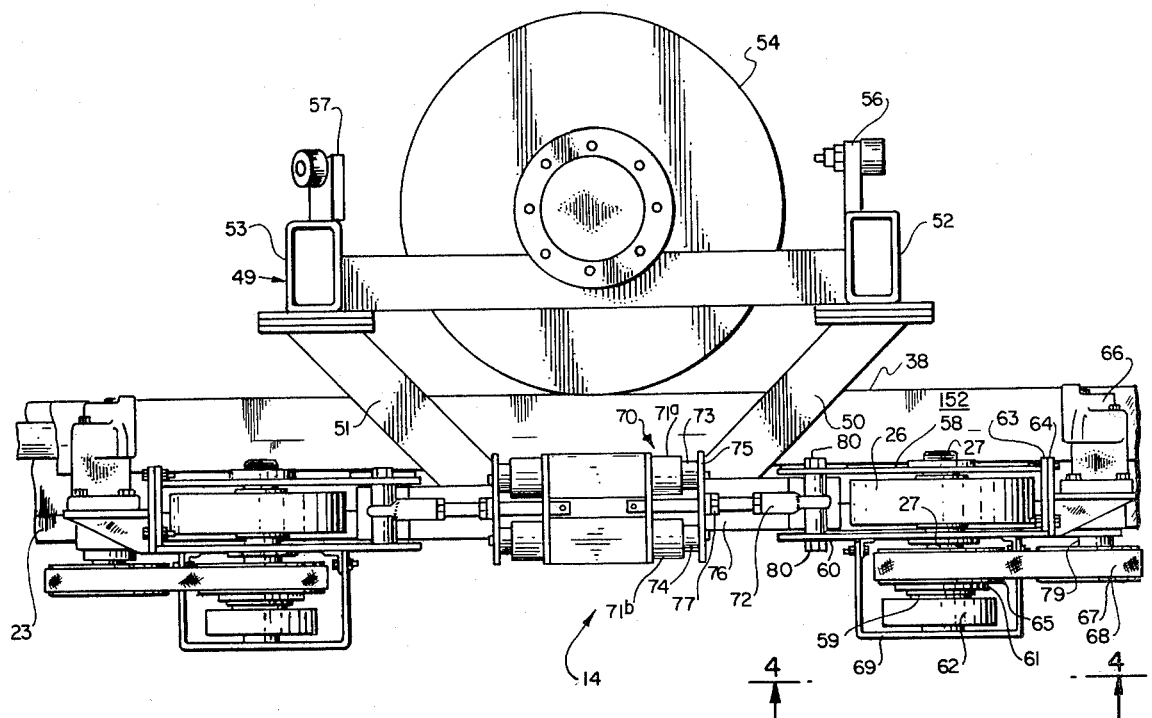
FIG. 3 is an elevated side view of the auxiliary traction system.

Referring to FIG. 3, the auxiliary traction system generally designated at 14 is attached by support struts 50 and 51 to the undercarriage assembly generally designated 49. Support struts 50 and 51 are secured at their lower ends to a fixed support member 76. The top ends of struts 50 and 51 are attached to the lower outer ends of support beams 52 and 53, respectively, which are in turn secured to the AGT vehicle at attachment arms 56 and 57.

As shown in FIG. 3, the auxiliary traction system 14 is constructed of two identical guide wheel assemblies. For purposes of simplifying the description, only one of the guide wheel assemblies is described in detail, it being understood that the other guide wheel assembly is similarly constructed.

Figure 4:
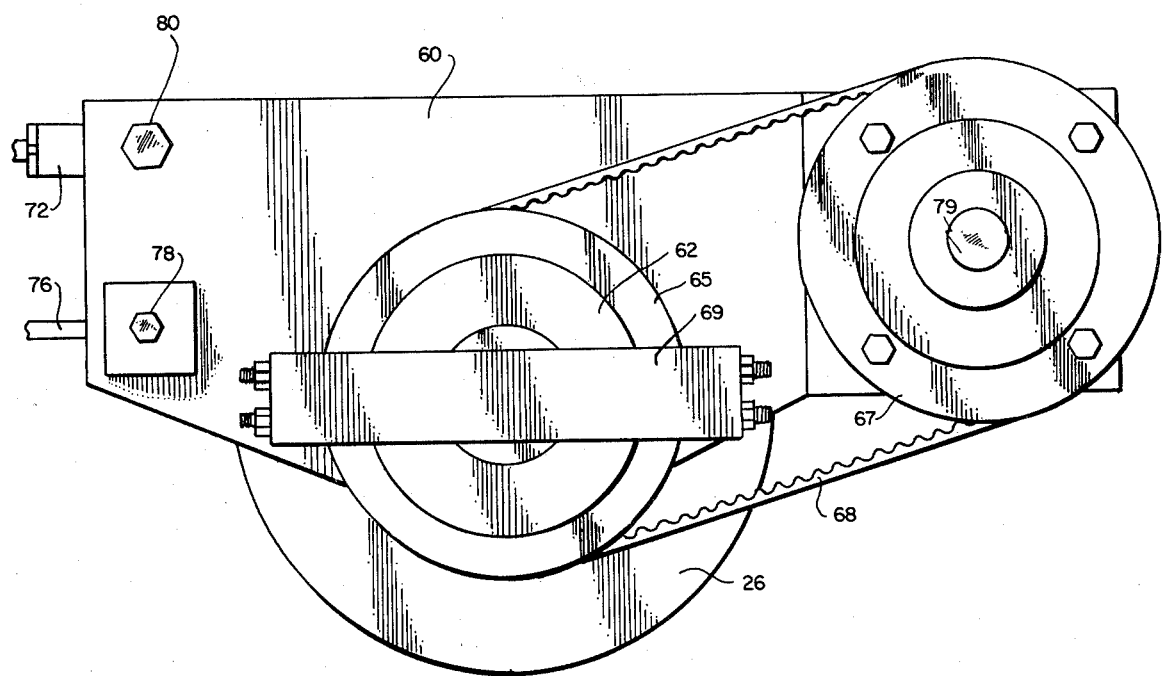
FIG. 4 is a bottom plan view of the auxiliary traction system taken along line 4—4 of FIG. 3.

The outer end of support member 76 is rotatably connected to the guide wheel assembly at pin 78 (see FIG. 4). Pin 78 is vertically oriented and is affixed between plates 58 and 60, providing both support and a fixed pivot point for plates 58 and 60 relative to the support member 76. Plates 58 and 60 lie in horizontal planes essentially parallel to the plane of the running surface 38. Guide wheel 26 is positioned between plates 58 and 60 with its axle 27 extending on either side of plates 58 and 60.

A hydraulic bias system for the guide wheel assembly is generally designated at 70 and is attached to the outward face of support member 76. Hydraulic bias system 70 is comprised of two hydraulically-charged cylinders 71a and 71b affixed adjacent and parallel to each other, having spring-biased piston members 73 and 74 extending from each end. Piston members 73 and 74 are affixed at their outer ends to a piston plate 75. The plate 75 has an aperture in its midsection through which an adjusting bolt 77 is affixed. A piston arm 72 extends outward through the aperture in plates 75, being releasably affixed thereto by the adjusting bolt 77. The extendable length of arm 72 may be adjusted by adjusting bolt 77.

The piston arm 72 is pivotally secured at its outward end about a pin 80 (see also FIG. 4), so as to permit axial rotation of pin 80 relative to piston arm 72. Pin 80 is vertically affixed between plates 58 and 60. An outward biasing force is communicated from the spring-biased hydraulic system 70 by means of pistons 73, which force the piston plate 75 outward. Plate 75 in turn pushes the arm 72 toward pin 80. The bias force against pin 80 causes plates 58 and 60 to rotate inwardly about pin 78 (see FIG. 4), forcing the guide wheel 26 into frictional engagement against the guide wheel running surface 23. The degree of frictional engagement between guide wheel 26 and running surface 23 is proportional to the amount of biasing force exerted by hydraulic system 70, and may be adjusted by modifying the spring force and/or hydraulic pressure in the hydraulic system (not shown).

With continued reference to FIG. 3, it is seen that a bracket 63 is affixed across the outer ends of plates 58 and 60 opposite from the connecting point of pins 78 and 80. Bracket 63 is oriented perpendicular to the plates 58 and 60.

Secured to the face of bracket 63 is a corresponding bracket 64, to which is mounted a hydraulic motor 66. Motor 66 is connected to the hydraulic fluid supply system (not shown) of the AGT vehicle and has a central shaft 79 extending from one end thereof, which shaft 79 may be rotated so as to drive the guide wheel 26 in either a forward or a reverse direction, as hereinafter more fully described. Since the hydraulic motor 66 may operate independently of the main drive system of the AGT vehicle, the guide wheel may advantageously be used as either an auxiliary drive traction system or, if need be, as the sole drive system of the AGT vehicle in the event the main drive system becomes inoperative.

As shown in FIG. 4, the motor 66 has a sprocket 67 axially mounted on the protruding end of the motor shaft 79. Attached to the extended lower portion of guide wheel axle 27 is a clutch 62. Clutch 62 is of a conventional type which has a rotatable journaled bearing (not shown) at its center. Clutch 62 is mounted to a clutch plate 59 (see FIG. 3) that may be selectively engaged or disengaged from a corresponding clutch plate 61. Clutch plate 61 is attached along its inner axial surface to the journaled bearing (not shown) of clutch 62. Sprocket 65 is coaxially mounted upon clutch plate 61 between clutch 62 and guide wheel 26.

Clutch 62 is supported by a bracket assembly 69 that is secured to the lower face of plate 60. A drive belt 68 is mounted upon sprockets 65 and 67. By engaging clutch plates 59 and 61, rotational force may be transmitted from sprocket 65 to clutch 62 and hence through axle 27 to guide wheel 26. With clutch plates 59 and 61 disengaged, guide wheel 26 is not driven by the motor 66. The clutch 62 may be operated by remote control from within the AGT vehicle in accordance with well-known conventional techniques.

An example of a suitable clutch which has been found to work well in this system is the Horton air clutch no. 9103-5H5OP. It is further notes that the Uniroyal power-grip HTD sprocket-P80-8M-50 satisfies the requirements for both sprockets 65 and 67, and may be used with a Uniroyal power-grip HTD belt 8M-50-47.24". Motors 66 may be, for example, a Char-Lynn model 110-1001. Clearly, motor 66 may be any type of hydraulic or electric motor having comparable characteristics to the motor described above. Likewise, other suitable types of clutches, sprockets and drive belts could be used in accordance with the present invention.

With further reference to FIGS. 2 and 4, it is seen that in order to avoid contact with the skirt portion 152 of guideway assembly 10, the motor 66 of each guide wheel assembly is positioned on the plate 60 so as to be situated outwardly of the skirt 152. Thus, as shown in FIG. 4, sprocket 67 is diagonally offset somewhat in relation to sprocket 65.

Figure 5:
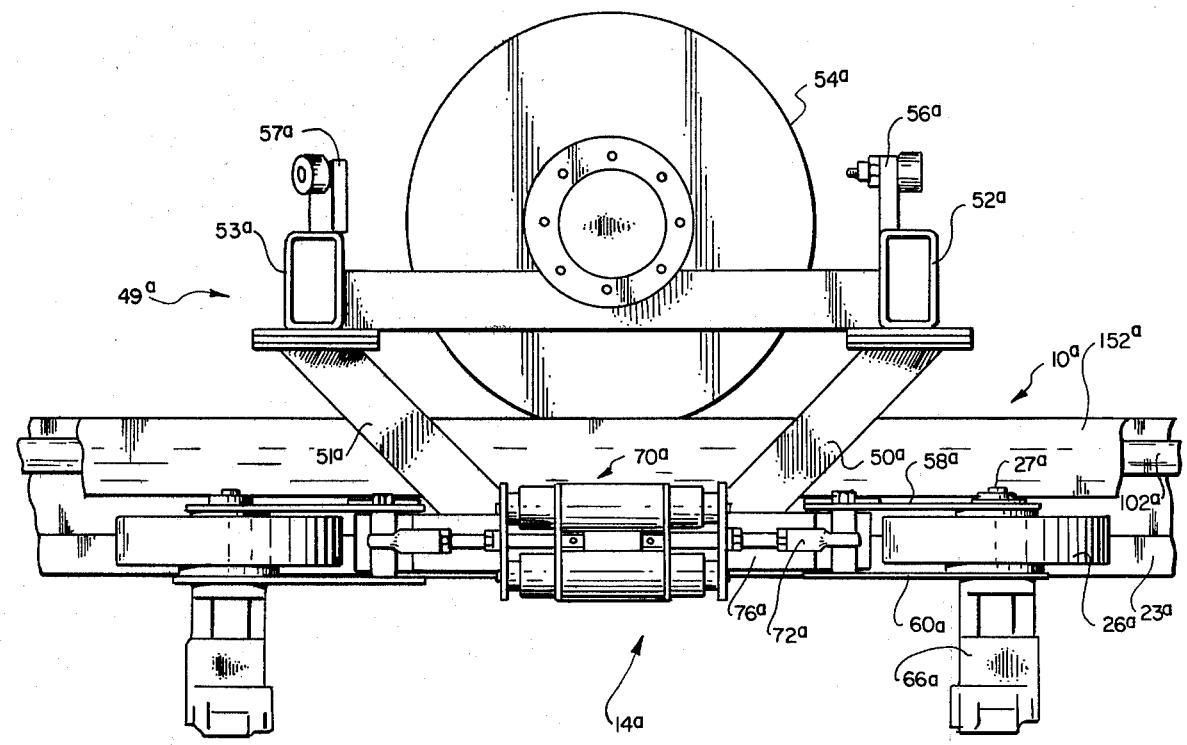
FIG. 5 is an elevated side view of another embodiment of the auxiliary traction system of the present invention.

Referring now to FIG. 5, another preferred embodiment of the invention is depicted. The structural elements of the embodiment of FIG. 5 are designated by numerals having the superscript "a", to denote that the structural elements of the embodiment of FIGS. 1–4 which are designated by like numerals have similar structure and function. In this embodiment, motor 66a of the guide wheel assembly is mounted to plate 60a directly under guide wheel 26a and is in axial alignment therewith. The shaft of motor 66a is coupled to the axle 27a of guide wheel 26a. Thus, in this embodiment, the motor 66a is directly coupled to the guide wheel axle 27a without the use of clutches, belts and sprockets as in the previously described embodiment.

As in the previously described embodiment, motor 66a is connected to the hydraulic fluid supply (not shown) of the AGT vehicle, and is independently operable of the AGT vehicle's main drive system. The operation of motor 66a may be remotely controlled from within the operating cab of the AGT vehicle 12.

From the foregoing description it will be apparent that the present invention provides an auxiliary drive traction system for AGT vehicles which is both simple in operation and effective in terms of increasing the safety and efficiency of the AGT vehicle's drive system during adverse weather conditions. The auxiliary drive traction system of the present invention may be used in conjunction with any type of AGT vehicle, including maintenance vehicles, which are commonly used to push or tow inoperative AGT vehicles needing repair or maintenance. The auxiliary drive traction system of the present invention permits such maintenance vehicles to efficiently tow other AGT vehicles even during heavy snow or ice conditions. The auxiliary drive traction system of the present invention also provides an independent drive system which may be used in the event the AGT vehicle's main drive system becomes inoperative, thus increasing the operational safety of the AGT vehicle.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A dual drive system for an automated guideway transit (AGT) vehicle that is adapted to travel along a guideway assembly, the guideway assembly having a drive wheel running surface and a guide wheel running surface independent of said drive wheel running surface, the dual drive system comprising:
   a main drive system having a plurality of drive wheels;
   means for driving said drive wheels; and
   an auxiliary drive traction system having a plurality of independently operated guide wheel assemblies, each of said guide wheel assemblies comprising:
   a guide wheel;
   means for selectively, adjustably biasing the guide wheel to increase the traction of the guide wheel against the guide wheel running surface;
   means for simultaneously driving each said guide wheel independently of said drive wheels; and
   clutch means for selectively engaging and disengaging said guide wheel from said means for driving said guide wheel in each direction of the movement of the (AGT) vehicle.

2. A system as defined in claim 1 wherein said biasing means comprises:
   a pair of plate members between which each said guide wheel is mounted; and
   a hydraulic piston pivotally coupled to one end of said plate members, said piston being operable to rotate said plate members about said pivotal connection so that said guide wheel will frictionally engage said guide wheel running surface.

3. A system as defined in claim 1 wherein said means for driving said guide wheel comprises a motor, said motor being coupled to said guide wheel and being operable to drive the guide wheel both forward and in reverse, relative to the direction of travel of said AGT vehicle.

4. A system as defined in claim 3 wherein said motor is a hydraulic motor connected to the main hydraulic fluid supply source of said AGT vehicle.

5. A dual drive system for an automated guideway transit (AGT) vehicle that is adapted to travel along a guideway assembly, the guideway assembly having a drive wheel running surface and a guide wheel running surface independent of said drive wheel running surface, the dual drive system comprising in combination:
   a main drive system having a plurality of drive wheels;
   means for driving said drive wheels; and
   an auxiliary drive traction system having a plurality of independently operated guide wheel assemblies, each of said guide wheel assemblies comprising:
   a guide wheel;
   means for simultaneously driving each said guide wheel independently of said drive wheels;
   clutch means for selectively engaging and disengaging said guide wheel from said means for driving said guide wheel in each direction of movement of the (AGT) vehicle; and
   means for selectively adjustably biasing said guide wheel so that it will frictionally engage said guide wheel running surface.

6. The dual drive system of claim 5 wherein said biasing means comprise:
   a pair of plate members between which said guide wheel is mounted; and
   a hydraulic piston pivotaly coupled to one end of said plate members, said pistons being operable to rotate said plate members about said pivotal connection so that said guide wheel will frictionally engage said guide wheel running surface.

7. A dual drive system as defined in claim 6 wherein said means for driving said guide wheel comprise a hydraulic motor, said hydraulic motor being coupled to said guide wheel and being operable to drive the guide wheel both forward and in reverse, relative to the direction of travel of said AGT vehicle.

8. A dual drive system for an automated guideway transit (AGT) vehicle that is adapted to travel along a guideway assembly, the guideway assembly having a drive wheel running surface and a guide wheel running surface independent of said drive wheel running surface, the dual drive system comprising in combination:
- a main drive system having a plurality of drive wheels;
- means for driving said drive wheels;
- an auxiliary drive traction system having a plurality of of guide wheels;
- biasing means comprising a pair of plate members between which each said guide wheel is mounted and a hydraulic piston pivotally coupled to one end of said plate members, said pistons being operable to rotate said plate members about said pivotal connection so that said guide wheel will frictionally engage said guide wheel running surface;
- a plurality of hydraulic motors for driving said guide wheels independently of said drive wheels, each said hydraulic motor being coupled to one of said guide wheels and being operable to drive the guide wheels both forward and in reverse, relative to the direction of travel of said AGT vehicle; and
- a plurality of clutch assemblies for coupling each said hydraulic motor to its respective guide wheel, each said clutch assembly comprising:
  - a first sprocket mounted to a corresponding drive shaft of one of said motors;
  - a second sprocket mounted on a corresponding axle of one of said guide wheels;
  - a drive belt mounted on said first end second sprockets;
  - a clutch mechanism mounted on said corresponding axle of one of the guide wheels; and
  - a first clutch plate mounted to said second sprocket and a second clutch plate mounted to said clutch mechanism, said clutch plates being operable to selectively engage and disengage said clutch mechanism from said axle of said guide wheel.

9. A dual drive system for an automated guideway transit (AGT) vehicle that is adapted to travel along a guideway assembly, the guideway assembly having a drive wheel running surface and a guide wheel running surface independent of said drive wheel running surface, the dual drive system comprising in combination:
- a main drive system having a plurality of drive wheels;
- means for driving said drive wheels;
- an auxiliary drive traction system having a plurality of guide wheels for providing directional stability to said AGT vehicle as it travels along said guideway assembly;
- additional means for driving said guide wheels independently of said drive wheels; and
- a plurality of clutch assemblies for coupling said means for driving said guide wheels to said guide wheels, each said clutch assembly comprising:
  - a first sprocket mounted to a corresponding drive shaft of one of said motors;
  - a second sprocket mounted on a corresponding axle of one of said guide wheels;
  - a drive belt mounted on said first and second sprockets;
  - a clutch mechanism mounted on said corresponding axle of one of the guide wheels; and
  - a first clutch plate mounted to said second sprocket and a second clutch plate mounted to said clutch mechanism, said clutch plates being operable to selectively engage and disengage said clutch mechanism from said axle of said drive wheel.

10. A system as defined in claim 9 wherein said means for driving said guide wheels are directly coupled to said guide wheels.

11. A dual drive system for an automated guideway transit (AGT) vehicle that is adapted to travel along a guideway assembly, the guideway assembly having a drive wheel running surface and a guide wheel running surface, the dual drive system comprising in combination:
- a main drive system having a plurality of drive wheels;
- means for driving said drive wheels;
- an auxiliary drive traction system comprising a plurality of guide wheels for providing directional stability to said AGT vehicle as it travels along said guideway assembly and a pair of guide wheel drive assemblies mounted to each side of said AGT vehicle, each said guide wheel drive assembly comprising in combination:
  - a fixed support member mounted to the undercarriage assembly of said AGT vehicle;
  - a pair of plate members pivotally mounted to one end of said fixed support member;
  - an axle mounted between said pair of plate members, said axle having a guide wheel mounted thereon;
  - a pin member mounted between said pair of plate members at one end thereof;
  - a piston arm pivotally attached at one end thereof to said pin member, the other end of said piston arm being joined by an adjustable bolt to a piston plate;
  - a pair of hydraulic cylinders connected to said piston plate and operable to drive said piston plate such that said pivotally mounted piston arm will cause said drive wheel to be rotated into frictional engagement with said guide wheel running surface;
  - a hydraulic motor mounted to said pair of plate members, said motor being operable independently of said means for driving said drive wheels and said motor having a drive shaft and a first sprocket connected to said drive shaft;
  - a second sprocket mounted on the axle of said guide wheel;
  - a drive belt mounted on said first and second sprockets;
  - a clutch mechanism for driving said axle of said guide wheel; and
  - a first clutch plate mounted to said second sprocket and a second clutch plate mounted to said clutch mechanisn, said clutch plates being operable to selectively engage and disengage said clutch mechanism from said axle of the guide wheel.

12. A dual drive system for an automated guideway transit (AGT) vehicle that is adapted to travel along a guideway assembly, the guideway assembly having a drive wheel running surface and a guide wheel running surface independent of said drive wheel running surface, the dual drive system comprising in combination:
- a main drive system having a plurality of drive wheels;
- means for driving said drive wheels;
- an auxiliary drive traction system comprising a plurality of independently operated guide wheels for providing directional stability to said AGT vehicle as it travels along said guideway assembly and a pair of independently operated guide wheel drive assemblies mounted to said side of said AGT vehicle, each said guide wheel drive assembly comprising in combination:

a fixed support member mounted to the undercarriage assembly of said AGT vehicle;

a pair of plate members pivotally mounted to one end of said fixed support member;

an axle rotatably mounted between said pair of plate members, said axle having a guide wheel mounted thereof;

a pin member mounted between said plate members at one end thereof;

a piston arm pivotally mounted at one end thereof to said pin member, said piston arm being joined at the other end thereof by an adjustable bolt to a piston plate;

a pair of hydraulic cylinders connected to said piston plate and operable to drive said piston plate such that said pivotally mounted piston arm will rotate said plate members relative to said fixed support member, causing said drive wheel to frictionally engage said guide wheel running surface;

a hydraulic motor having a drive shaft that is directly coupled to said axle of the guide wheel, said hydraulic motor being operable independently of said means for driving said drive wheels; and clutch means for selectively engaging and disengaging said guide wheel from said means for driving said guide wheel in each direction of the movement of the (AGT) vehicle.

13. An automated guideway transit (AGT) system having a guideway assembly and an AGT vehicle for traveling along said guideway assembly, said AGT system comprising in combination:

a generally horizontal drive wheel running surface;

a guide wheel running surface positioned beneath said drive wheel running surface and generally perpendicular thereto;

a protective skirt member for partially shielding said guide wheel running surface from wind-driven snow and other adverse weather conditions;

a main drive system having a plurality of drive wheels;

means for driving said drive wheels; and an auxiliary drive traction system having a plurality of independently operated guide wheel assemblies, each of said guide wheel assemblies comprising:

a guide wheel for providing directional stability to said AGT vehicle as it travels along said guideway assembly;

means for simultaneously driving each said guide wheel independently of said drive wheels;

clutch means for selectively engaging and disengaging said guide wheel from said means for driving said guide wheel in each direction of movement of the (AGT) vehicle; and means for selectively adjustably biasing said guide wheel so that it will frictionally engage said guide wheel running surface.

14. An AGT system as defined in claim 13 wherein said means for driving said guide wheel are directly coupled to said guide wheel.

15. A system as defined in claim 13 wherein said means for biasing said guide wheel comprise at least one pivotal plate member on which said guide wheel is mounted, and at least one hydraulically actuated piston pivotally joined to said plate member and operable so as to pivot said plate member such that said guide wheel will frictionally engage the guide wheel running surface.

16. An AGT system as defined in claim 13 wherein said means for driving said guide wheel comprise a motor, said motor being coupled to said guide wheel and being operable to drive the guide wheel both forward and in reverse, relative to the direction of travel of said AGT vehicle on said guideway assembly.

* * * * *

UNITED STATES PATENT AND TRADEMARK OFFICE
CERTIFICATE OF CORRECTION

PATENT NO. : 4,382,412

DATED : May 10, 1983

INVENTOR(S) : Donald P. Sullivan

It is certified that error appears in the above-identified patent and that said Letters Patent is hereby corrected as shown below:

Column 4, line 56, "notes" should be --noted--
Column 6, line 54, "pivotaly" should be --pivotally--
Column 7, line 7, "of of guide" should be --of guide--
Column 9, line 11, "thereof" should be --thereon--

Signed and Sealed this

Twenty-sixth Day of July 1983.

[SEAL]

Attest:

GERALD J. MOSSINGHOFF

Attesting Officer     Commissioner of Patents and Trademarks